United States Patent [19]

Ferretti

[11] 4,080,306

[45] Mar. 21, 1978

[54] PREPARATION OF BaFCl:Eu PHOSPHORS

[75] Inventor: August Ferretti, Wilmington, Del.

[73] Assignee: E. I. Du Pont de Nemours and Company, Wilmington, Del.

[21] Appl. No.: 826,061

[22] Filed: Aug. 19, 1977

Related U.S. Application Data

[63] Continuation-in-part of Ser. No. 683,396, May 5, 1976, abandoned.

[51] Int. Cl.$^2$ .............................................. C09K 11/46
[52] U.S. Cl. ............................................ 252/301.4 H
[58] Field of Search ................................ 252/301.4 H

[56] References Cited

U.S. PATENT DOCUMENTS

| | | | |
|---|---|---|---|
| 2,303,917 | 12/1942 | Dietz | 252/301.4 H |
| 2,303,963 | 12/1942 | Uhle | 252/301.4 H |
| 3,951,848 | 4/1976 | Wolfe et al. | 252/301.4 H |
| 3,988,252 | 10/1976 | Ferretti | 252/301.4 H |

FOREIGN PATENT DOCUMENTS

| | | |
|---|---|---|
| 896,453 | 3/1972 | Canada. |
| 2,541,748 | 4/1976 | Germany. |
| 1,419,169 | 12/1970 | United Kingdom. |

OTHER PUBLICATIONS

Stevels "Philips Research Reports", vol. 30, No. 5, Oct. 1975, pp. 277–290.
Leverenz "An Introduction to Lumini of Solids", John Wiley & Sons, 1950, pp. 78–79.

*Primary Examiner*—Jack Cooper

[57] ABSTRACT

A process for preparing BaFCl:Eu phosphors of controllable particle size and size distribution is provided. The process comprises (a) preparing an intimate mixture of fine particles of BaFCl, a europium source, preferably water-soluble EuCl$_3$, and a water-soluble chloride as flux; (b) firing the mixture in an inert atmosphere at a temperature in the range of about 550°–900° C and above the liquid temperature of the flux for a time sufficient to effect reaction and diffusion, and (c) washing the fired product with water to remove the chloride flux. By preselecting the combination of firing temperature and flux concentration in the mixture, phosphor particles of a predetermined size and size distribution can be obtained. This control of the phosphor product is especially advantageous when the intimate mixture is formed in an aqueous medium.

18 Claims, No Drawings

PREPARATION OF BaFCl:Eu PHOSPHORS

CROSS REFERENCES TO RELATED APPLICATIONS

This application is a continuation-in-part of application Ser. No. 683,396, filed May 5, 1976, and now abandoned.

BACKGROUND OF THE INVENTION

1. Field of the Invention

This invention relates to processes for the preparation of Eu-doped BaFCl phosphors and more particularly to such processes in which the resulting phosphor particle size and particle size distribution is controllable.

2. Description of the Prior Art

There is much prior art in the phosphor field, but apparently none disclosing the process of the present invention. The most relevant art is considered to be as follows:

1. A. N. Campbell and A. J. R. Campbell, Trans. Faraday Soc. 35, 241 (1939), shows that BaFCl forms by precipitation from a water $BaCl_2/BaF_2$ solution at 25° C.

2. Fernberger, U.S. Pat. No. 2,373,071 discloses phosphors with divalent europium activators. Among the hosts cited are the alkaline earth fluorides $CaF_2$ and $SrF_2$. The patent states that "in preparing europium-activated phosphors, the general procedure may consist in adding a suitable europium compound to a batch of the matrix material in a fine state of division, and firing or heating the batch to a suitable temperature for a substantial length of time; the europium compound employed may be incorporated with the matrix material by dissolving the europium compound in water and thoroughly wetting down the finely divided matrix material with the solution to a stiff paste or a slurry, which may then be dried in a steam oven and powdered again. The bath may be heated with or without exposure to the air, or in a protective or reducing atmosphere, as of hydrogen; and sometimes different conditions may be employed in succession during the heating."

3. The copending, commonly assigned application of L. H. Brixner, U.S. Ser. No. 603,452 filed Aug. 11, 1975, and now abandoned, describes luminescent compositions comprising an organic binder and selected barium and strontium europium fluorohalides and the use of these compositions in luminescent screens.

4. The copending, commonly assigned application of A. Ferretti, U.S. Ser. No. 522,880 filed Nov. 11, 1974, now U.S. Pat. No. 3,988,252, discloses a process for making BaFCl:Eu phosphors by intimately mixing a substantially stoichiometric mixture of the appropriate metal halides, e.g., $BaCl_2$, $BaF_2$ and $EuF_3$, having at least 30% of the particles less than 1.5μ with the remaining particles having an average particle size less than 3μ, firing in an atmosphere free of hydrogen at 600° to 900° C. for a time sufficient to effect reaction. The product is then pulverized and the particles preferably classified to obtain a product with suitable particle size and particle size distribution for X-ray screens.

None of these references discloses the preparation of Eu-doped BaFCl phosphor of controllable particle size and particle size distribution by firing the host material BaFCl and a Eu source.

SUMMARY OF THE INVENTION

According to the present invention there is provided a process for preparing a europium doped BaFCl phosphor comprising (a) preparing an intimate mixture consisting essentially of particles of BaFCl having a MSED less than 2 microns, a europium source and a chloride flux of at least one water-soluble chloride selected from the group consisting of an alkali metal chloride and an alkaline earth metal chloride, (b) firing said mixture in an inert atmosphere at a temperature in the range of about 550°–900° C and above that necessary to form liquid flux for a time sufficient to effect reaction and diffusion, and (c) washing the fired product with water to remove the chloride flux.

A preferred process of the present invention for preparing a europium doped BaFCl phosphor comprises (a) forming a slurry consisting of an aqueous solution of $BaCl_2$ and solid $BaF_2$ with the amount of $BaCl_2$ being in excess of the stoichiometric amount needed to form BaFCl, agitating the resulting slurry for a time sufficient to allow the $BaF_2$ to be replaced by particles of BaFCl, said particles having a MSED less than 2 microns, and removing sufficient $H_2O$ or $BaCl_2$ solution to entrain excess $BaCl_2$ with the BaFCl particles, (b) intimately mixing a europium source with the BaFCl, (c) drying the mixture, (d) heating the dried mixture in a nitrogen atmosphere at a temperature in the range of about 550°–900° C for a time sufficient to effect reaction and diffusion and (e) washing the fired product with water to remove excess $BaCl_2$.

The different chemical characteristics of the Eu sources dictate that different methods be used for intimately mixing the Eu source and the BaFCl powder. It is convenient and most preferred to use water-soluble $EuCl_3$ as the Eu source. $EuCl_3$ can be added to the BaFCl as an aqueous solution and uniform distribution of the Eu throughout the mixture can be achieved without any milling by precipitating the $EuCl_3$ simultaneously with the flux. $EuF_2$ and $EuF_3$ can also be used as sources of Eu; however, in order to achieve sufficient mixing, these materials are milled to form a powder consisting of particles with MSED than 8 microns. Water can be used as the milling agent for $EuF_2$ but an organic liquid is used as the milling agent for $EuF_3$. With these Eu sources, the flux serves as a liquid medium during firing to promote the uniform distribution of the Eu source throughout the phosphor and is one factor in controlling the particle size of the phosphor product.

When BaFCl:Eu phosphor is produced by firing a mixture of $BaF_2$, $BaCl_2$ and a Eu source, e.g., $EuF_3$, as disclosed by the aforesaid Ferretti U.S. Pat. No. 3,988,252, a fraction of the powder product consists of subsize particles of phosphor, i.e., particles too small to be used in luminescent screens. In addition, some second phase material is also produced and is mainly present in the form of fine particles. These so-called "fines", containing both BaFCl:Eu and a Eu-rich phase, are a potential source of additional phosphor and Eu and it has been discovered that these fines can be used as an Eu-source in the instant process. A sufficiently intimate mixture is achieved by simply stirring the fines with BaFCl in an aqueous solution of the flux. The flux serves the additional purpose of aiding the conversion of refractory barium europium fluorides present into useful phosphor.

DETAILED DESCRIPTION OF THE INVENTION

A method has now been discovered for producing europium doped barium fluorochloride phosphors in which the Eu is uniformly distributed and for producing such phosphors with a controllable particle size and particle size distribution. Such phosphors can be produced by mixing Eu with host BaFCl and firing this mixture in the presence of a flux consisting of water-soluble chlorides; provided certain requirements are met.

The first requirement is that the BaFCl host, in the form of fine particles, be intimately mixed with Eu source materials and a selected concentration of chloride flux. There are a number of ways of preparing an imtimate mixture of the starting materials.

The second requirement is that this mixture be fired under the proper conditions. An inert atmosphere consisting of $N_2$ or the noble gases is used. The particular firing temperature and time are chosen to insure that a molten phase is present during a large fraction of the thermal cycle. The melting point can be lowered by selecting more than one chloride flux. A particular firing temperature is also selected so as to provide phosphor particles of a desired size and size distribution. The product is then washed with water with sufficient agitation to remove the soluble flux.

By fulfilling the above requirements, the control of (a) the particle size and admixture of the starting materials, (b) the flux composition and concentration and (c) the firing conditions, yields rounded phosphor particles with controllable particle size and particle size distribution without a need for milling after firing and without a need for milling before firing in the case of the preferred process.

It is important that the BaFCl starting material be in the form of fine particles. The powder particles should have an MSED (mean spherical equivalent diameter) of less than $2\mu$ with 90% of the particles having a SED (spherical equivalent diameter) less than $3\mu$, these quantities being measured as described later with a Coulter Counter ® Model TA-II sold by Coulter Electronics of Hialeah, Florida.

BaFCl host powders satisfying the above requirements can be made by firing $BaCl_2$ and $BaF_2$ or some other fluoride as described by Dietz, U.S. Pat. No. 2,303,917 and Uhle, U.S. Pat. No. 2,303,963 and then grinding the BaFCl sufficiently to produce the desired particle size. An alternate and especially preferred method of producing finely divided BaFCl is by a digestion-precipitation process involving $BaF_2$ and $BaCl_2$ in an aqueous medium as first carried out by Campbell and Campbell (Ref. 1). The driving force for this reaction is the difference in the solubilities of $BaF_2$ and BaFCl in $BaCl_2$ aqueous solution. The process can be carried out over a wide range of conditions, e.g., a temperature of 20° C to 90° C; a PH of 1.2 to 6.0; a reaction time of 1 hour to 52 hours; manner of mixing such as magnetic stirrers, ball and pebble mills, etc.

When stoichiometric amounts of $BaCl_2$ are used, the BaFCl product contains $BaF_2$. Excess $BaF_2$ in the starting formulation is detrimental to final phosphor properties, i.e., lower prompt emission and higher lag, no matter what process is employed to make BaFCl:Eu. The use of excess $BaCl_2$ in starting formulations has generally proven to be beneficial, resulting in superior phosphor with higher prompt emission. Therefore in order to drive the precipitation-digestion reaction toward complete utilization of the $BaF_2$, excess $BaCl_2$ is used. There is no upper limit to the amount of excess $BaCl_2$ which can be used except as may be dictated by economics and equipment. As little as possible should be used. Typical amounts of excess $BaCl_2$ range from about 0.5–100 percent on a molar basis, preferably from about 0.5–10 percent, and most preferably under 2 percent. The amount of excess required is determined by the quantity of water used and the manner of mixing employed. When starting with a saturated $BaCl_2$ solution and adequate stirring, single phase BaFCl is always produced.

Excess $BaCl_2$ is desirable and should be used for still another reason. $BaCl_2$ is one of the chlorides found to be useful as a flux in the instant process and it has been found that when excess $BaCl_2$ is present in the digestion-precipitation solution, some of the $BaCl_2$ is entrained with the BaFCl precipitate and, if not washed, is therefore available during the firing step. Typically, amounts of $BaCl_2$ ranging up to 20% by weight of BaFCl present are found entrained with the BaFCl. When used in the preferred process, the BaFCl host does not have to be dried and the $BaCl_2$ solution does not have to be removed before adding the Eu source if the Eu source is $EuCl_3$, $EuF_2$, or Eu fines (discussed later). With the above preparation, a one hour reaction time yields particles of $0.5\mu$ average size as determined by scanning electron microscope analysis, while a 4 hour reaction time yields particles of approximately $1\mu$. When longer mixing times are employed, there is an increase in the particle size of the BaFCl host. A reaction time of approximately one month at room temperature yields particles with a MSED of $1.7\mu$; 80 percent of the product being made up of particles with a SED between $1\mu$ and $3\mu$.

In addition to the $BaCl_2$ that is entrained, one can add about 0.1–25 percent by weight, based on the weight of BaFCl, of at least one water-soluble chloride in aqueous solution to the europium source-BaFCl mixture, the chloride being selected from the group consisting of KCl, NaCl, LiCl, $BaCl_2$, $CaCl_2$, $SrCl_2$ and $MgCl_2$.

A number of sources of Eu have been demonstrated with the process of the invention. The Eu source must be sufficiently fine in particle size or in solution and must be intimately mixed with the BaFCl host powder. The particular method for accomplishing this will depend on the different characteristics of the source. Eu sources such as $EuF_2$, $EuF_3$ and $Ba_{1-x}Eu_xFCl$ must be milled with the BaFCl host powder in order to achieve the necessary intimate mixture of host and Eu source. $EuF_2$ can be milled with water as the milling agent while organic milling agents should be used with $EuF_3$ or $Ba_{1-x}Eu_xFCl$ if they are wet milled. Wet milling is preferred, particularly with larger size batches. After milling, these Eu sources usually consist of fine particles with a MSED less than $8\mu$. The most preferred source, $EuCl_3$, is water-soluble and can be added to the BaFCl in aqueous solution. Uniform distribution of the Eu throughout the mixture can then be achieved without any milling by precipitating the Eu source in fine particle form. $EuCl_2$ can also be added as an aqueous solution; however, such solutions are not stable in air and must be covered with an inert gas such as $N_2$. As a result, care must be taken in forming an intimate mixture of the BaFCl, $EuCl_2$ and flux. One such method is freeze drying techniques. With all of these Eu sources, the amount of Eu source material used ranges from about 0.5 – 5 mol percent based on the amount of BaFCl used, preferably under 2 mol percent.

When BaFCl:Eu phosphor is produced by following the Ferretti disclosure in the aforesaid U.S. Pat. No. 3,988,252, which consists of firing $BaCl_2$, $BaF_2$ and a Eu source such as $EuF_3$, a fraction of the powder product formed after milling and classification consists of sub-size particles of phosphor, i.e., particles too small to be used in luminescent screens. In addition, some second phase material is also produced. This second phase consists of refractory barium europium fluorides, typified by $Ba_7Eu_6F_{32}$, which inhibit Eu diffusion. This situation is greatly alleviated in the instant process in which flux is provided to facilitate diffusion and uniform distribution of Eu and to control particle size of the phosphor. Because of its refractory nature, this Eu-rich second phase is also present as fine particles which are removed along with the fine phosphor particles during the classification step. These so-called "fines", containing both BaFCl:Eu and Eu-rich phase, can be used as a Eu-source in the instant process. The fines are generally particles with a SED less than 4u. It has been found that sufficient mixing is achieved by simply stirring the fines and the BaFCl in an aqueous solution of the flux. When those fines are used as the Eu-source the ratio of the weight of added BaFCl to the weight of fines can range from 0 to as high as 6.

A chloride flux provides a liquid phase during the firing cycle and thereby promotes the uniform distribution of Eu throughout the phosphor and aids in the production of phosphor particles with controllable size and size distribution. It is therefore necessary that the flux be intimately mixed with the BaFCl and the Eu-source. One method of obtaining such an intimate mixture is by milling the fluxing material and the BaFCl-Eu-source mixture. A preferred method of adding the flux is by precipitation. For example, an aqueous solution of water-soluble chlorides is added to the BaFCl-Eu-source mixture and the resulting slurry dried, thereby precipitating the flux throughout the mixture. When a water-soluble Eu-source such as $EuCl_3$ is used, it can be coprecipitated with the flux.

The water-soluble chlorides are chosen from the group of alkali metal and alkaline earth metal chlorides, preferably those of K, Na, and Li, and those of Ca, Ba, Sr, and Mg. Various combinations of the alkali metal and alkaline earth metal chlorides can be used to form eutectic melting points with a liquid phase being produced at lower temperatures if two or more chlorides are used. A particular flux system which is especially useful is that of a binary mixture of $BaCl_2$ and KCl. A particularly preferred flux system is a ternary mixture of $BaCl_2/CaCl_2/KCl$. The relative quantities of the three chlorides determine the melting temperature of the flux. Desired results of this invention can be obtained with $BaCl_2/CaCl_2/KCl$ fluxes in which the content by weight of each constituent in terms of the total weight of flux used is: $BaCl_2$ — 0 to 100 percent; $CaCl_2$ — 0 to 50 percent; and KCl — 0 to 95 percent; with the preferred ranges $BaCl_2$ — 0.5 to 100 percent; $CaCl_2$ — 0 to 40 percent; and KCl — 0 to 60 percent.

When fines are used as the Eu source, the flux also serves the additional purpose of aiding the conversion of europium-rich barium europium fluorides into useful phosphor. $CaCl_2$ appears to be especially useful in this regard and the flux should contain 20 to 40 percent $CaCl_2$ when Eu-source fines are used.

While the flux composition determines the temperature at which there is liquid flux, it should be appreciated that the quantity of flux used determines the amount of liquid phase present during firing which in turn greatly influences particle growth. It is thought that particle size is increased by solid state diffusion and growth across the particle contact surfaces. For firing temperatures above 700° C, it has been found that the phosphor particle size decreases with increasing flux concentration. This trend is attributed to the fact that the process of solution, diffusion through a liquid, and precipitation is usually slower than diffusion across a solid boundary. In the flux system, solid state diffusion growth is restrained by the presence of liquid phase. The liquid phase introduces an additional phase boundary interface and also increases the diffusion path length of the transferred material. Both of these factors result in smaller particle size. For firing temperatures below 700° C, there is little change in particle size with changes in flux content.

The quantity of flux used is in the range of about 0.1 to about 25 weight percent of the amount of BaFCl present, preferably about 0.1 to 10 percent. Preselection of the flux concentration together with firing temperature determines the particle size of the phosphor product as is shown in the examples.

The BaFCl, Eu-source, and flux mixture is dried prior to firing. Typical drying conditions are at 130° C for from 4 to 60 hours under a vacuum; however, any convenient conditions can be used.

The dried mixture is then placed in a container made of nonreactive material such as $Al_2O_3$, vitreous or graphitic carbon, and fired in an inert atmosphere, e.g., nitrogen, the noble gases, or mixtures thereof can be used. A temperature in the range from 550° to 900° C, preferably from 600° to 880° C, is maintained for from about 5 to 60 minutes. As mentioned previously, a particular firing temperature and time are chosen giving consideration to the amount and composition of the flux. The time of firing must be sufficient to allow the reaction to take place, i.e. for the replacement of $Ba^{2+}$ by $Eu^{2+}$ and when trivalent Eu sources are used to allow the reduction of $Eu^{3+}$ to $Eu^{2+}$, and for the diffusion of europium throughout the phosphor. It is desirable to have molten flux present during a large fraction of the thermal cycle. For a given flux concentration and flux composition, particle size increases when higher firing temperatures are used. The particle size distribution broadens with decreasing particle size. In selecting firing conditions, it is important that the temperature selected will give a high diffusion rate so that the uniform distribution of Eu throughout the phosphor is achieved.

The furnace employed can be any suitable furnace in which the atmosphere surrounding the sample can be controlled prior to and during residence in the heated zone. For example, belt-type furnaces, where the sample and container move through a heated zone in a continuous manner on a belt, are suitable.

After firing, the product is washed with water to remove the flux and then dried. The resulting free-flowing phosphor powder has rounded edges and surfaces and has a predetermined, desired particle size and size distribution.

The present process has a number of advantages. By the use of water in the preferred process, all milling is eliminated and pollution is minimized through the elimination of organic liquids used in milling. Since timeconsuming milling is eliminated, unit production is greater. Also, since europium is more uniformly distributed in the phosphor particles, less europium is used.

SPECIFIC EMBODIMENTS OF THE INVENTION

This invention is further illustrated by the following examples.

Particle size data in the examples is obtained with a Coulter Counter ® Model TA-II. The Coulter Counter measures the equivalent volume of each particle. This is accomplished by forming a dilute suspension of the particles in an electrolyte in which they are not soluble, passing the suspension through an orifice, and measuring the change in resistance as a particle passes through. Orifices are available which can measure particles ranging in size from $0.5\mu$ to $200\mu$. The measuring of the change in resistance results in the determination of an effective volume of the particle; one can then arrive at a spherical equivalent diameter (SED), i.e., the diameter of a spherical particle of this same volume. A MSED (mean spherical equivalent diameter) for a distribution of particles is obtained by calculating the mean of the particles SED's weighted with the particle volume. In addition to the MSED, it is useful to define a parameter which characterizes the distribution of particle volumes, B.I., the broadness index. The B.I. relates to the factor by which the volume of a particle at the 90 percent point on the cumulative volume percentage plot must be multiplied to equal the volume at the 10 percent point on this plot. The B.I. is defined in the relationship $$Vol_{10\%} = 2\left(\frac{B.I.}{2}\right) Vol_{90\%}$$

The prompt emission and lag characteristics of the phosphors of the examples are measured as described below. These quantities are compared with those of commercial Du Pont Par $CaWO_4$ as a standard, measured at the time of the run.

PROMPT EMISSION AND LAG (a) Sample Preparation

The phosphor is sieved with a 200 mesh sieve, and the following components are measured into a 15cc vial containing 8 4mm diameter glass beads.
3.75 gm phosphor
1.00 ml butyl acetate
2.54 gm polyvinyl butyral binder (Cf U.S. 3,043,710)
The mixture is shaken on a Spex ® oscillatory-type shaker for 15 minutes, then immediately coated on a pigment board using a Goodner mechanical coater and a 10 ml draw-down knife. The resultant coating is dried in air for at least 15 minutes to give a dry coating 5 ± 1 mil (130 $\mu$ ± 25$\mu$) in thickness. A 1 inch + 1 ½ inch sample is cut from the coated board and mounted on a pigment board with other samples and standards for exposure tests.

(b) Sample Testing

The pigment board with the screen samples attached is inserted into an 8 inch + 10 inch (20.3 cm + 25.4 cm) cassette containing a sheet of high speed medical X-ray film, in this instance Cronex 4 ® film. A prompt emission exposure of 0.6 m.a.s. (0.24 sec, 25 m.a. 80 Kvp) is made at 25 inches from a tungsten source filtered by ¼ inch aluminum. The film is then removed and processed in an automatic rapid processor which is operated at 33° C and contains the standard p-N-methylamino hydrosulfate/hydroquinone developer, with a total processing time of 90 seconds (develop, fix, wash and dry). The optical density of the exposed and developed film is determined using a Macbeth digital densitometer and recorded as the prompt emission.

Lag is determined by exposing the samples to 400 m.a.s. (200 m.a. 25 sec 80 KVP) X-rays from the same tungsten source, then after 15 seconds contacting the screen sample with a fresh piece of film for 5 minutes. The film is then developed and the optical density is measured as described above for prompt emission. The optical density so recorded is the lag.

Standards are run with each set of samples to ensure uniformity.

The background is determined by exposing a piece of the same X-ray film employed to determine lag to the lag exposure in the absence of any test screen. The difference between the background and lag is recorded as the net lag.

Precipitated BaFCl when used in the examples is made by a procedure illustrated by the following:

135 g $BaCl_2.2H_2O$ (Fisher, Cert. Grades) was completely dissolved in 375 ml of water, filtered through a glass frit and the pH then adjusted to between 1 and 2 by the addition of HCl. To this solution was added 45.7 g $BaF_2$ (BARCO) and the resulting mixture stirred for 3 hours at room temperature. The $BaCl_2$ solution was filtered off using a sintered glass funnel. The solid product was washed with water and air dried followed by vacuum drying at 120° C for 14 hours. The product weighed 82.3 g. X-ray analysis of a 2 g test sample showed BaFCl and a small amount of $BaCl_2.2H_2O$ estimated to be about 2 percent by weight of the product.

EXAMPLE 1

30.0 g of precipitated BaFCl powder with MSED less than $2\mu$ was covered with a minimum amount of water. A solution of $EuCl_3$ was made from $Eu_2O_3$ and HCl by dissolving the oxide in a minimum amount of hot $HCl/H_2O$ solution. The $EuCl_3$ solution was concentrated and then diluted with additional water three times to insure removal of possible excess HCl. An amount of this solution containing 0.803 g of $EuCl_3$ was added to the BaFCl along with aqueous solutions containing 0.838 g of $BaCl_2$, 0.668 g of $CaCl_2$, 0.600 g KCl and .833 g $SrCl_2$; each in a minimum amount of water. The amount of added flux was 9.8 weight percent based on the 30 g of BaFCl present. The dish containing the resulting slurry was loosely covered, placed in a vacuum oven which was rapidly pumped down and held at 130° C for 14 hours. The resulting dried mixture was placed in a vitreous carbon boat and the boat placed in a belt-type furnace and fired in a nitrogen atmosphere at 750° C for a 1 hour firing cycle, i.e., 15 minutes at maximum temperature. The fired product was washed in water using ultrasonic agitation to remove the water-soluble flux which is then filtered and dried.

The dried phosphor product was a powder having a MSED of 13.0$\mu$ and a particle size distribution indicated by broadness index of 12.5.

The product passing a 200 mesh screen had a prompt emission of 2.36 and lag was 0.22. The background lag was 0.22 so that the net lag was 0. The standard Par CaWO$_4$ screen had a prompt emission of .97 and a lag of 0.23.

EXAMPLES 2 – 6

Example 1 is repeated in the following examples to show the effects of various amounts of flux, flux composition and firing conditions on the phosphor produced.

Shown in Table I are the weight of precipitated BaFCl used, the weights of EuCl$_3$ and the various fluxes added in an aqueous solution to the BaFCl and the total weight percent of added flux based on the amount of BaFCl used. The resulting slurry of BaFCl in the EuCl$_3$-flux aqueous solution was vacuum dried at 130° C as described in Example 1 for at least 4 hours. The resulting dried mixture was fired in a nitrogen atmosphere as described in Example 1 at a maximum temperature and for firing cycle time shown in Table I. In a one hour firing cycle, the sample was at maximum temperature for about 15 minutes. In a 45 minute cycle the sample was at maximum temperature for 5 minutes.

properties, a mixture of 100 g precipitated BaFCl with MSED less than 2μ and aqueous solutions containing 2.691 g of EuCl$_3$, 2.22 g BaCl$_2$, 2.78 g CaCl$_2$, and 1.0 g of KCl was prepared. The total added flux was 6 weight percent of the BaFCl. This mixture was divided into 8 samples (17–24) and heated to temperatures shown in Table III with a 1 hour firing cycle. Before heating, additional KCl was added to samples 19 and 20 to make the total flux added to those samples 6.5%. The products of the firings were washed to remove water-soluble flux. The particle size characteristics and the phosphor characteristics are also shown in Table III. Note that, as discussed previously, higher firing temperatures result in an increase in particle size and a narrowing of the particle size distribution. The lag was lowest for firing temperatures between 650° C and 800° C.

EXAMPLES 25-27

A mixture of 50 g of precipitated BaFCl with MSED less than 2μ and aqueous solutions containing 1.345 g of

TABLE I

| Example | BaFCl g | EuCl$_3$ g | Flux BaCl$_2$ g | CaCl$_2$ g | KCl g | SrCl$_2$ g | Wt. % Added Flux | Firing Temp C° / Cycle Time (Hr) |
|---|---|---|---|---|---|---|---|---|
| 2 | 15 | 0.403 | 1.5 | 0 | .15 | 0 | 11.0 | 850/1 Hr |
| 3 | 15 | 0.403 | 1.5 | 0 | .15 | 0.416 | 13.8 | 850/1 |
| 4 | 15 | 0.401 | 0.375 | 0 | .15 | 0.416 | 6.3 | 850.1 |
| 5 | 15 | 0.403 | 1.5 | 0 | .15 | 0 | 11.0 | 800/1 |
| 6 | 15 | 0.403 | 1.5 | 0 | .15 | 0.416 | 13.8 | 800/1 |
| 7 | 15 | 0.401 | 0.375 | 0 | .15 | 0.416 | 6.3 | 825/3/4 HR |
| 8 | 15 | 0.401 | 0.375 | 0 | .15 | 0.416 | 6.3 | 775/3/4 HR |
| 9 | 15 | 0.401 | 0.375 | 0 | .15 | 0.416 | 6.3 | 760/1 |
| 10 | 600 | 17.235 | 60 | 0 | 6 | 0 | 11.0 | 850/3/4 |
| 11 | 6000 | 172.35 | 600. | 0 | 60 | 0 | 11.0 | 810/3/4 |
| 12 | 30 | 0.60 | .819 | 0.66 | 0.60 | .819 | 9.7 | 750/1 |
| 13 | 15 | 0.403 | .83 | 0.33 | 0.33 | 0 | 10.0 | 750/1 |
| 14 | 15 | 0.403 | 1.21 | 0.33 | 0.33 | 0 | 12.4 | 750/1 |
| 15 | 10 | 0.672 | 0 | 0 | 0 | 0.373 | 3.73 | 820/1 |
| 16 | 10 | 0.672 | 0 | 0 | 0 | 0.373 | 3.73 | 880/1 |

TABLE II

| | PARTICLE SIZE RESULTS | | PHOSPHOR CHARACTERISTICS | | | |
|---|---|---|---|---|---|---|
| Example | MSED-μ | Broadness Index-B.I. | Prompt Emission Lag | Background Lag | Net Lag | Par Prompt Emission Lag |
| 2 | 42.0 | 7 | 2.39/0.26 | 0.23 | .03 | 1.04/0.25 |
| 3 | 45.0 | 8 | 2.47/0.31 | 0.23 | .08 | " |
| 4 | 48.0 | 5.5 | 2.56/0.20 | 0.20 | 0 | " |
| 5 | 28.0 | 12 | 2.38/0.23 | 0.23 | 0 | " |
| 6 | 29.0 | 11 | 2.27/0.23 | 0.23 | 0 | " |
| 7 | 34.0 | 8.5 | 2.56/0.20 | 0.20 | 0 | 1.26/0.21 |
| 8 | 19.0 | 13 | 2.50/0.20 | 0.20 | 0 | " |
| 9 | 20.0 | 14 | 2.50/0.20 | 0.20 | 0 | " |
| 10 | 42.0 | 8.5 | 2.18/0.22 | 0.22 | 0 | .91/.27 |
| 11 | 33.0 | 8.5 | 2.56/0.19 | 0.19 | 0 | 1.05/0.28 |
| 12 | 13.0 | 12.5 | 2.36/0.22 | 0.22 | 0 | .97/.23 |
| 13 | 8.8 | 14.5 | 1.65/0.22 | 0.20 | .02 | .71/.23 |
| 14 | 9.8 | 16 | 1.84/0.21 | 0.20 | .01 | .71/.23 |
| 15 | NA | NA | 2.30/0.42 | 0.21 | .21 | 1.03/0.21 |
| 16 | NA | NA | 1.83/0.84 | 0.18 | .66 | 1.09/0.18 |

NA = not available

Particle size and size distributions were measured and results are indicated in Table II. Results of measurements of prompt emission, lag and background lag are also given in Table II along with net lag and prompt emission and lag results for the standard Par CaWO$_4$ screen.

EXAMPLES 17-24

To illustrate the effect of firing temperature on phosphor particle size and size distribution and phosphor EuCl$_3$, 1.11 g BaCl$_2$, 1.39 g CaCl$_2$, and 2.5 g KCl was prepared. The total added flux was 10 weight percent. The resulting slurry was vacuum dried at 130° C for 4 hours. The dried mixture was divided into 3 samples (Examples 25-27) each of which was heated in a nitrogen atmosphere for a 1 hour cycle with maximum temperatures shown in Table III. The products were washed with water to remove water-soluble flux. Resulting phosphor particle size and phosphor properties are also listed.

TABLE III

| Example | Firing Temperature C° | PARTICLE SIZE RESULTS | | PHOSPHOR CHARACTERISTICS | | | |
|---|---|---|---|---|---|---|---|
| | | MSED-μ | Broadness Index B.I. | Prompt Lag | Background Lag | Net Lag | Par Prompt Lag |
| 17 | 550 | 1.15 | 28+ | 1.26/1.06 | 0.22 | .84 | .92/.23 |
| 18 | 600 | 1.40 | 14+ | 2.02/0.89 | 0.22 | .67 | .92/.23 |
| 19 | 650 | 2.5 | 12.5 | 1.81/0.26 | 0.20 | .06 | .71/0.23 |
| 20 | 700 | 6.5 | 10.5 | 1.90/0.20 | " | 0 | .71/0.23 |
| 21 | 750 | 12.0 | 15.0 | 1.95/0.25 | " | .05 | .71/0.23 |
| 22 | 800 | 31.0 | 9.0 | 1.87/0.32 | " | .12 | .71/0.23 |
| 23 | 850 | 38.0 | 8.5 | 1.94/0.74 | " | .54 | .71/0.23 |
| 24 | 900 | 43.0 | 6.5 | 2.00/1.25 | " | 1.05 | .71/0.23 |
| 25 | 600 | 1.8 | 22.5+ | 1.64/0.92 | " | .72 | .71/0.23 |
| 26 | 650 | 2.3 | 17.5+ | 1.75/0.43 | " | .23 | .71/0.23 |
| 27 | 700 | 5.8 | 17.0 | .90/0.22 | " | .02 | .71/0.23 |
| 28 | 600 | 2.7 | 22+ | 1.65/0.95 | " | .75 | .71/0.23 |
| 29 | 650 | 2.5 | 14+ | 1.81/0.46 | " | .26 | .71/0.23 |
| 30 | 700 | 5.3 | 10.5+ | 1.64/0.24 | " | .04 | .71/0.23 |
| 31 | 750 | 6.7 | 12+ | 1.84/0.24 | " | .04 | .71/0.23 |

EXAMPLES 28-31

A mixture of 50 g of precipitated BaFCl with MSED less than 2μ and aqueous solutions containing 1.345 g EuCl$_3$, 1.11 g BaCl$_2$, 1.39 g CaCl$_2$, and 4.0 g KCl was prepared. The total added flux was 13.0 weight percent. The resulting slurry was vacuum dried at 130° C for 4 hours. The dried mixture was divided into 4 samples (Examples 28-31) each of which was heated in a nitrogen atmosphere for a 1 hour cycle with maximum temperatures shown in Table III. The products were washed with water to remove water-soluble flux. Resulting phosphor particle size and phosphor properties are also listed.

Comparison of the results given for some of the above Examples shows the effect of total added flux concentration on product particle size for a given firing temperature. As can be seen at the lower firing temperatures (600° C), additional flux results in sightly larger particles, e.g., compare Examples 18, 25 and 28. At slightly higher firing temperatures (650° C), changes in flux concentration appear to have little effect on particle size, compare Examples 19, 26 and 29. At still higher firing temperatures (700° C and 750° C), higher flux concentrations result in decreased particle size, e.g., compare Examples 20, 27 and 30 and Examples 21, 13 and 31.

EXAMPLES 32-34

30 g of precipitated BaFCl powder with MSED less than 2μ was milled with 0.594 g EuF$_2$ for 4 hours with P/C (90 volume percent Perclene/10 volume percent Cellosolve) is the milling agent. The mixture was dried in air at 268° C for 1 hour. The mixture was then divided into 3 samples of equal weight. No additional flux was added to one of the samples (Example 32); it contained only the entrained BaCl$_2$. The other samples were placed into 6 inches Pyrex ® dishes and covered with a minimum of water. .01 g KCl in aqueous solution was added to one sample (Example 33) to give an added flux of 0.1 weight percent 0.165 g SrCl$_2$ g in aqueous solution was added to the second sample (Example 34) to give an added flux of 1.65 weight percent. The mixtures were then vacuum dried at 130° C for 14 hours. Examples 32-34 were then fired in a N$_2$ atmosphere at 885° C with a 1 hour firing cycle. The product of Example 32 had a prompt emission of 2.49 and a lag of 0.90 with a net lag of 0.69. The product of Example 33 was found to have a prompt emission of 2.48 and a lag of 0.21. The net lag was zero. The product of Example 34 was found to have a prompt emission of 2.50 and a lag of 0.41 with a net lag of 0.02. The standard Par CaWO$_4$ screen had a prompt emission of 1.14 and a lag of 0.21.

EXAMPLES 35-40

The procedures used with these Examples were similar to those used in Examples 33 and 34. The quantities of precipitated BaFCl, EuF$_2$, and fluxes along with the milling liquid and time of milling are shown in Table IV. The mixtures were vacuum dried at 130° C for 14 hours. Firing (carried out in a nitrogen atmosphere) conditions and product properties are shown in Table V. As before, a one hour firing cycle results in the sample being exposed to the maximum temperature (listed in Table V) for about 15 minutes. A two hour cycle results in a 60 minute exposure to maximum temperature.

TABLE IV

| Example | BaFCl g | EuF$_2$ g | Flux | | | | Wt. % Added Flux | Mill. Liq. | Mill Time Hr. |
|---|---|---|---|---|---|---|---|---|---|
| | | | BaCl$_2$ g | CaCl$_2$ g | KCl g | SrCl$_2$ g | | | |
| 35 | 15 | .291 | 0.375 | 0 | 0 | 0 | 2.5 | H$_2$O | 1 |
| 36 | 7.50 | .147 | 0.187 | 0 | 0.007 | 0 | 2.6 | H$_2$O | ½ |
| 37 | 7.50 | 0.147 | 0.187 | 0 | 0.007 | 0 | 2.6 | H$_2$O | ½ |
| 38 | 7.50 | 0.147 | 0.187 | 0 | 0.007 | 0 | 5.1 | H$_2$O | ½ |
| 39 | 8.75 | 0.48 | 0.537 | 0 | 0 | 0.263 | 9.1 | F/M | 14 |
| 40 | 8.75 | 0.48 | 0.537 | 0 | 0 | 0.263 | 9.1 | F/M | 14 |

F/M = Freon TF/Methanol 90 Vol %/ 10 Vol %

TABLE V

| Example | Firing Temp° C Cycle Time-Hr | PARTICLE SIZE RESULTS | | PHOSPHOR CHARACTERISTICS | | | |
|---|---|---|---|---|---|---|---|
| | | MSED-μ | Broadness Index B.I. | Prompt Lag | Background Lag | Net Lag | Par Prompt Lag |
| 35 | 880/1 Hr | 28 | 12 | 2.27/0.74 | 0.20 | 0.54 | 1.18/0.23 |

TABLE V-continued

| | | PARTICLE SIZE RESULTS | | PHOSPHOR CHARACTERISTICS | | | |
|---|---|---|---|---|---|---|---|
| Example | Firing Temp° C Cycle Time-Hr | MSED-$\mu$ | Broadness Index B.I. | Prompt Lag | Background Lag | Net Lag | Par Prompt Lag |
| 36 | 850/2 | 39 | 9 | 2.32/0.83 | 0.20 | 0.63 | .94/.21 |
| 37 | 800/1 | 11.5 | 21.5 | 2.31/0.55 | 0.20 | 0.35 | " |
| 38 | 850/1 | 13.0 | 13 | 2.38/.83 | 0.20 | 0.63 | " |
| 39 | 800/1 | NA | NA | 1.41/0.22 | 0.18 | 0.04 | 1.06/0.22 |
| 40 | 870/1 | NA | NA | 1.27/0.22 | 0.18 | 0.04 | " |

EXAMPLE 41

19.56 g of precipitated BaFCl powder with MSED less than 2$\mu$, 0424 g EuF$_3$ and 0.196 g KCl were milled for 14 hours with Perclene/Cellosolve (90/10 volume percent) as the milling agent. The added flux was 1 weight percent based on the BaFCl present. The mixture was vacuum dried at 130° C for 2 hours. This mixture was heated to 900° C in a nitrogen atmosphere with a 1 hour firing cycle. The product was washed with water to remove water-soluble flux. The product passing a 200 mesh screen had a prompt emission of 2.32 and a lag of 0.20.

EXAMPLES 42-43

19.56 g of precipitated BaFCl powder with MSED less than 2$\mu$, 200 g BaCl$_2$.2H$_2$O and 0.424 g EuF$_3$ were milled for 16 hours with H$_2$O as the milling agent. The mixture was vacuum dried at 130° C for 2 hours. The mixture was divided into two equal portions. One portion served as Example 42; no additional flux was added. 0.01 g KCl in aqueous solution was added to the second portion which was then vacuum dried and served as Example 43. Both samples were heated at 880° C in a nitrogen atmosphere with a one hour firing cycle. The products were than washed with water to remove water-soluble chloride flux. The product of Example 42 exhibited a prompt emission of 2.16 and a lag of 1.28 while that of Example 43 had a prompt emission of 2.29 and a lag of 0.42.

EXAMPLE 44

25.42 g of precipitated BaFCl powder wth a MSED less than 2$\mu$ was mixed with 3.13 g of Ba$_{0.6}$Eu$_{0.4}$FCl, 0.59 g SrF$_2$ and 0.753 gm of SrCl$_2$. This mixture was milled for 16 hours with an organic milling agent consisting of 90 volume percent Freon TF ® and 10 volume percent methanol. The mixture was then vacuum dried at 130° C for 14 hours. The dried mixture was placed in a boat and fired at 800° C in a nitrogen atmosphere with a one hour firing cycle. The product was washed with water to remove water-soluble chloride flux. That product passing a 200 mesh screen showed a prompt emission of 2.37 and a lag of 0.37 corresponding to a net lag of 0.19. The Par CaWO$_4$ screen had a prompt emission of 1.22 and a lag of 0.21.

EXAMPLE 45-51

A portion of a batch of fines with a MSED of 2.7$\mu$ and a B.I. of 10+ was used as a source of Eu and BaFCl in Examples 45, 46, 47, 48 and 50. In Examples 49 and 51 additional BaFCl (made by the precipitation method and with MSED less than 2$\mu$) was added. The fines consisted of particles with a SED less than 4$\mu$. X-ray analysis showed that the fines consisted of BaFCl and Ba$_7$Eu$_6$F$_{32}$; this BaFCl is doped with a small amount of Eu.

Solutions containing the amounts of flux shown in Table VI were added to the amounts of fines and precipitated BaFCl shown and stirred. The slurries were vacuumed dried at 130° C for 14 hours, placed in a vitreous carbon boat, and then fired in a nitrogen atmosphere with the cycle time and the maximum temperature shown in Table VI. The weight percent of added flux shown in Table VI is based on the total weight of fines and added BaFCl. The fired products were washed with water to remove water-soluble chloride fluxes. X-ray analysis of the products showed a trace of Ba$_7$Eu$_6$F$_{32}$ in the product of Example 48 and an even lesser amount in that of Example 50. There was no evidence of Ba$_7$Eu$_6$F$_{32}$ in the products of the other Examples in this group. X-ray analysis also showed that in addition to the phosphor product, EuF$_3$ was present in small amounts in all products; however, there were only trace amounts of EuF$_3$ present in the products of Examples 49 and 51 in which BaFCl was added to the fines. These X-ray results along with the resulting X-ray screen properties shown in Table VII indicate that the flux was successful in converting fines into useful phosphor. The MSED, B.I., and the volume percent of particles with SED greater than 32$\mu$ and with SED between 1.6 and 3.2$\mu$ are shown in Table VII along with phosphor properties. Comparison of Examples 45 with 47 and 46 with 48 show again that with identical flux concentrations, increased firing temperatures result in increased particle sizes. Comparison of Examples 45 with 47 and 46 with 48 show again that at a given firing temperature, increased flux results in smaller particle sizes. All Examples showed little if any lag. Examples 49 and 51 in which additional BaFCl was used show the highest prompt emission.

EXAMPLE 52

Aqueous solutions containing 64 g BaCl$_2$, 133 g CaCl$_2$ and 120 g KCl were added to 5000 g of precipitated BaFCl and 1000 g of fines as used in Examples 45-51 and the resulting slurry was stirred. A minimum amount of water was used for each solution. The mixture was dried at 110° C for 24 hours. The dried mixture was then heated at 725° C in a nitrogen atmosphere with a 45 minute firing cycle. The product was washed with water to remove water-soluble flux. The phosphor product had a MSED of 12.5$\mu$ and a B.I. of 11.5. The product passing a 200 mesh screen showed a prompt emission of 2.22 and a lag of 0.67 corresponding to a net lag of 0.46.

EXAMPLE 53

A solution of EuCl$_3$ was made by dissolving 1 g of Eu$_2$O$_3$ in a minimum amount of HCl/H$_2$O solution. This was added to another solution which contained 200 ml H$_2$O, 1 g KCl and 90 g BaCl$_2$.2H$_2$O. Not all of the salt was dissolved at this point. Next 53 g of BaF$_2$ was added and the mixture stirred for 3 hours. The resulting slurry was dried at 90° C for 14 hours, then at 120° C for 8 more hours. The dried slurry was placed in a vitreous carbon boat and fired in an $N_2$ atmosphere at 725° C for a 1-hour cycle. The product was washed with water using stirring agitation to remove water soluble flux.

The powder product had an MSED of 8.2μ and the particle size distribution has a broadness index of 15.5.

The product passing a 325 mesh screen had a prompt emission of 2.21 and lag was 0.19. The background lag was 0.19 so that net lag was 0. The Par $CaWO_4$ screen had a prompt emission of 0.90 and a lag of 0.20.

EXAMPLE 54

Preparation was the same as Example 53 except that 77.1 g of $BaCl_2.2H_2O$ was used and all chloride components were completely dissolved before the BaFhd 2 was added.

The powder product had an MSED of 12.0μ and the particle size distribution has a broadness index of 19.

The product passing a 325 mesh screen had a prompt emission of 2.27 and lag was 0.20. The background lag was 0.19 so that net lag was 0.01. The Par $CaWO_4$ screen had a prompt emission of 0.90 and lag of 0.20.

TABLE VI

| Example | Added BaFCl g | Fines g | Flux BaCl₂ g | CaCl₂ g | KCl g | Wt. % Added Flux | Firing Temp C° Cycle Time (Hr) |
|---|---|---|---|---|---|---|---|
| 45 | 0 | 15 | 0.835 | 0.66 | 0.075 | 10.5 | 800/1 |
| 46 | 0 | 15 | 0.835 | 0.66 | 0.075 | 10.5 | 700/1 |
| 47 | 0 | 15 | 0.415 | 0.33 | 0.075 | 5.5 | 800/1 |
| 48 | 0 | 15 | 0.415 | 0.33 | 0.075 | 5.5 | 700/1 |
| 49 | 10 | 10 | 1.26 | 1.00 | 0.40 | 13.3 | 800/1 |
| 50 | 0 | 30 | 0.83 | 0.66 | 0.15 | 5.5 | 750/1 |
| 51 | 10 | 5 | 0.41 | 0.33 | 0.07 | 5.4 | 800/1 |
| 52 | 5000 | 1000 | 64 | 133 | 120 | 5.3 | 725/3/4 |

TABLE VII

| Exaple | PARTICLE SIZE RESULTS | | | | PHOSPHOR CHARACTERISTICS | | | |
|---|---|---|---|---|---|---|---|---|
| | MSED-μ | Broadness Index-B.I. | Vol % >32μ | Vol % 1.6-3.2μ | Prompt Emission Lag | Background Lag | Net Lag | Par Prompt Emission Lag |
| 45 | 15 | 14 | 12.6 | <0.1 | 2.16/0.25 | 0.23 | 0.02 | 1.04/0.25 |
| 46 | 7.9 | 12 | 1.2 | 5.4 | 1.91/0.23 | 0.23 | 0 | 1.04/0.25 |
| 47 | 16.5 | 14.5 | 4.6 | <0.1 | 2.15/0.23 | 0.23 | 0 | 1.04/0.25 |
| 48 | 8.6 | 11.5 | 1.5 | 4.0 | 1.92/0.23 | 0.23 | 0 | 1.04/0.25 |
| 49 | 14 | 10.5 | 1.0 | 2.0 | 2.40/0.22 | 0.22 | 0 | 0.97/0.23 |
| 50 | 11 | 11 | <0.1 | 1.3 | 2.08/0.22 | 0.22 | 0 | 0.97/0.23 |
| 51 | 17 | 10 | 4.0 | <0.1 | 2.30/0.23 | 0.22 | 0.01 | 0.97/0.23 |
| 52 | 12.5 | 11.5 | — | — | 2.22/0.67 | 0.21 | 0.46 | — |

What is claimed is:

1. A process for preparing a europium doped BaFCl phosphor comprising: (a) preparing an intimate mixture consisting essentially of particles of BaFCl having a MSED less than 2 microns, a europium source which is selected from the class consisting of $EuCl_3$, $EuCl_2$, $EuF_2$, $EuF_3$, BaFCl:Eu, and $Ba_7Eu_6F_{32}$ and about 0.1-25 percent by weight, based on the weight of BaFCl, of a chloride flux of at least one water-soluble chloride selected from the group consisting of alkali metal chlorides and alkaline earth metal chlorides, (b) firing said mixture in an inert atmosphere at a temperature in the range of about 550°-900° C and above the liquid temperature of the flux of a time sufficient to effect reaction of europium with the BaFCl including the reduction of any $Eu^{3+}$ to $Eu^{2+}$ and diffusion of europium throughout the phosphor, and (c) washing the fired product with water to remove the chloride flux.

2. The process of claim 1 wherein the flux is at least one of KCl, NaCl, LiCl, $CaCl_2$, $BaCl_2$, $SrCl_2$, and $MgCl_2$.

3. The process of claim 2 wherein the firing temperature is in the range of about 600°-880° C.

4. The process of claim 3 wherein the chloride flux concentration is about 0.1-10 percent by weight.

5. The process of claim 3 wherein the flux is a mixture of $BaCl_2$, $CaCl_2$ and KCl or a mixture of $BaCl_2$ and KCl.

6. The process of claim 3 wherein the intimate mixture is prepared by slurrying the BaFCl particles and Eusource particles in an aqueous solution of the chloride flux and then removing the water.

7. The process of claim 1 wherein the BaFCl is prepared by forming a slurry consisting of an aqueous solution of $BaCl_2$ and solid $BaF_2$ with the amount of $BaCl_2$ being in excess of the stoichiometric amount needed to form BaFCl and agitating the resulting slurry for a time sufficient to allow the solid $BaF_2$ to be replaced by particles of BaFCl.

8. The process of claim 7 wherein an aqueous solution of a water-soluble europium source is added to the precipitated BaFCl to form a slurry.

9. The process of claim 8 wherein the water-soluble europium source is $EuCl_3$.

10. The process of claim 8 wherein at least one water-soluble chloride flux selected from the group consisting of KCl, NaCl, LiCl, $CaCl_2$, $BaCl_2$, $SrCl_2$, and $MgCl_2$ is added to the aqueous slurry containing the particles of BaFCl and the europium source.

11. The process of claim 1 wherein the time of firing is in the range of 5 to 60 minutes.

12. A process for preparing a europium doped BaFCl phosphor comprising: (a) forming a slurry consisting essentially of an aqueous solution of $BaCl_2$ and solid $BaF_2$ with the amount of $BaCl_2$ being about 0.5-100 mole percent in excess of the stoichiometric amount needed to form BaFCl, agitating the resulting slurry for a time sufficient to allow the $BaF_2$ to be replaced by particles of BaFCl, said particles having a MSED less than 2 microns, and removing sufficient $H_2O$ or $BaCl_2$ solution to entrain excess $BaCl_2$ with the BaFCl particles, (b) intimately mixing a europium source which is selected from the class consisting of $EuCl_3$, $EuCl_2$, $EuF_2$, $EuF_3$, BaFCl:Eu and $Ba_7EU_6F_{32}$ with the BaFCl, (c) drying the mixture, (d) firing the dried mixture in a nitrogen atmosphere at a temperature in the range of about 550°–900° C for a time sufficient to effect reaction of europium with the BaFCl including the reduction of any $Eu^{3+}$ to $Eu^{2+}$ and diffusion of europium throughout the phosphor, and (e) washing the fired product with water to remove excess $BaCl_2$.

13. The process of claim 12 wherein the europium source is $EuCl_3$ in aqueous solution.

14. The process of claim 12 wherein about 0.1–25 percent by weight, based on the weight of BaFCl, of at least one water-soluble chloride in aqueous solution is added to the europium source-BaFCl mixture, said chloride selected from the group consisting of KCl, NaCl, LiCl, $BaCl_2$, $CaCl_2$, $SrCl_2$ and $MgCl_2$.

15. The process of claim 14 wherein the added chloride is a mixture of $CaCl_2$, KCl, and $BaCl_2$, or a mixture of $BaCl_2$ and KCl.

16. The process of claim 13 wherein about 0.1–25 percent by weight, based on the weight of BaFCl, of at least one water-soluble chloride in aqueous solution is added to the mixture of the europium source and BaFCl, said chloride selected from the group consisting of KCl, NaCl, LiCl, $BaCl_2$, $CaCl_2$, SrCl and $MgCl_2$.

17. The process of claim 16 wherein the added chloride is a mixture of $CaCl_2$, KCl and $BaCl_2$ or a mixture of $BaCl_2$ and KCl.

18. The process of claim 12 wherein the time of firing is in the range of 5 to 60 minutes.

* * * * *